G. W. BELL.
ANTIVIBRATION DEVICE FOR AUTOMOBILES AND LIKE VEHICLES.
APPLICATION FILED MAY 15, 1916.

1,289,041.

Patented Dec. 24, 1918.
4 SHEETS—SHEET 1.

WITNESSES:

INVENTOR
George William Bell
BY
ATTORNEYS

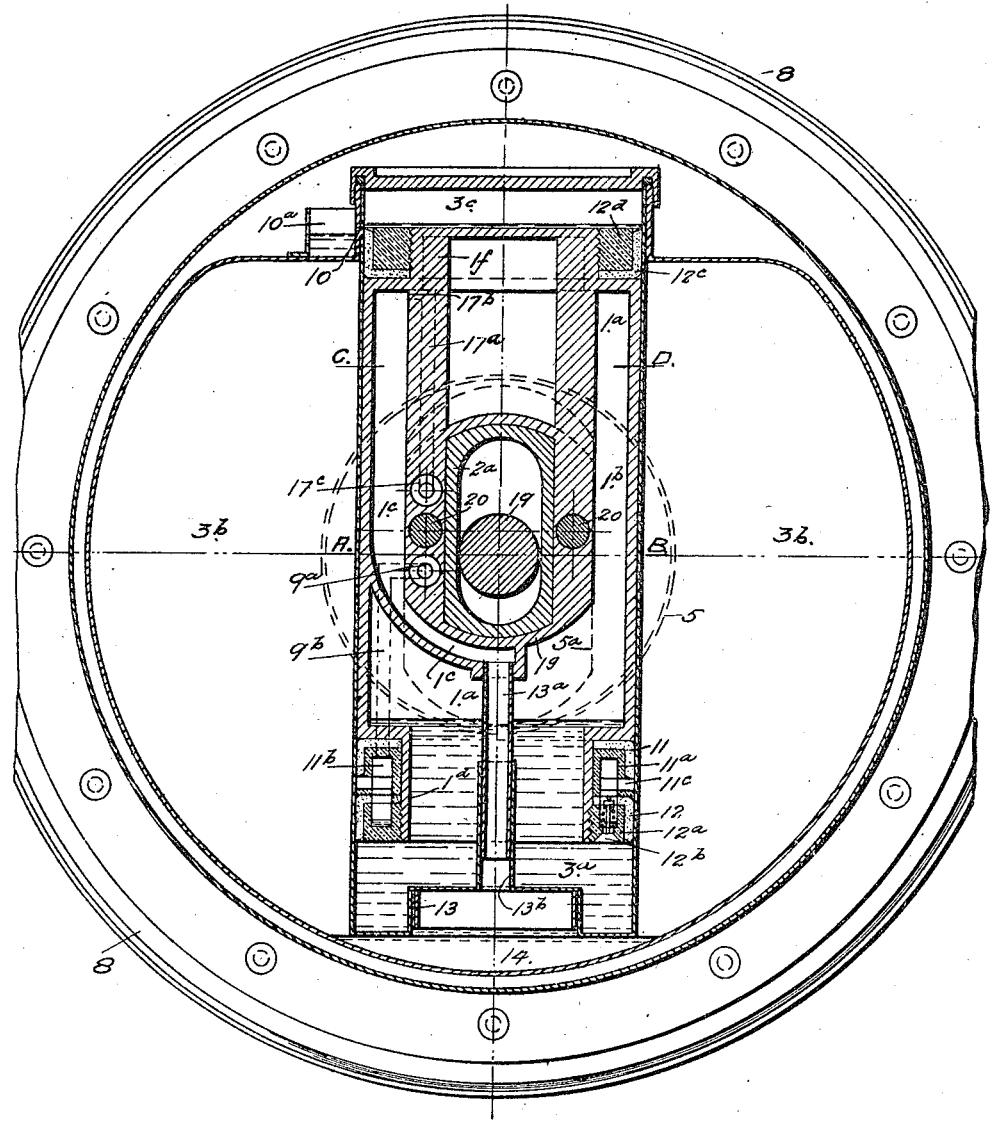

G. W. BELL.
ANTIVIBRATION DEVICE FOR AUTOMOBILES AND LIKE VEHICLES.
APPLICATION FILED MAY 15, 1916.

1,289,041.

Patented Dec. 24, 1918.
4 SHEETS—SHEET 3.

WITNESSES:
Chas W. Stauffiger
Anna M. Dorr

INVENTOR
George William Bell
BY
ATTORNEYS

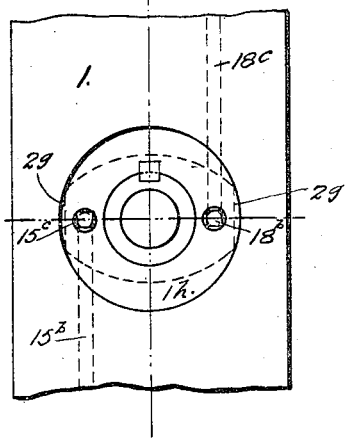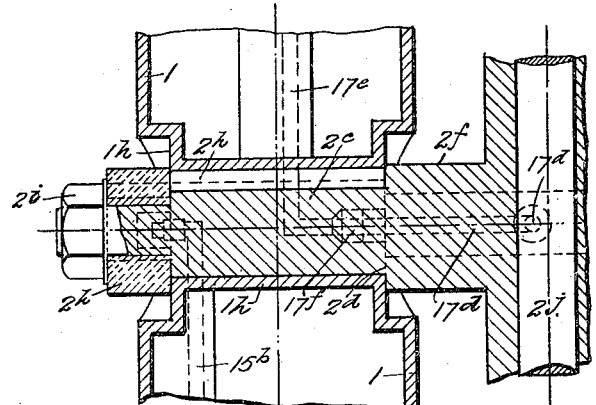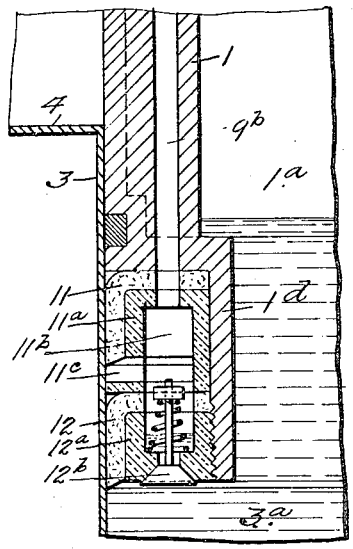

UNITED STATES PATENT OFFICE.

GEORGE WILLIAM BELL, OF LIVERPOOL, ENGLAND.

ANTIVIBRATION DEVICE FOR AUTOMOBILES AND LIKE VEHICLES.

1,289,041. Specification of Letters Patent. Patented Dec. 24, 1918.

Application filed May 15, 1916. Serial No. 97,543.

*To all whom it may concern:*

Be it known that I, GEORGE WILLIAM BELL, a subject of the King of England, residing at Liverpool, in the county of Lancaster, England, have invented certain new and useful Improvements in Antivibration Devices for Automobiles and like Vehicles, of which the following is a specification, reference being had therein to the accompanying drawings.

This invention has reference to anti-vibration devices of the piston and cylinder type, as applied between the wheels and axles or bodies of automobiles and like vehicles, but more particularly to that type disposed between the wheels and axles and in the hub or plane of the wheel, and has for its object, improvements in the method and means of automatically maintaining the piston or plunger air-tight in the cylinder of the suspension device and to lubricate the parts thereof, and also to facilitate the making of the air connections to and from the said device in the hub of the wheel air tight, when the latter is mounted on and secured to the axle of the vehicle.

I will further describe my invention with the aid of the accompanying sheets of explanatory drawings in which:—

Fig. 2, is a vertical longitudinal section of the device shown in Fig. 1.

Figure 3:
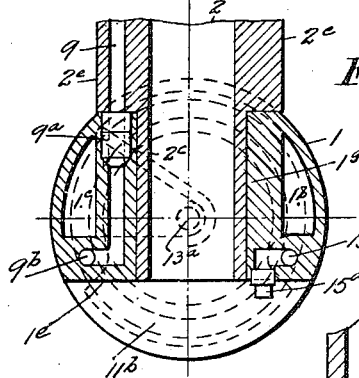
Figure 4:
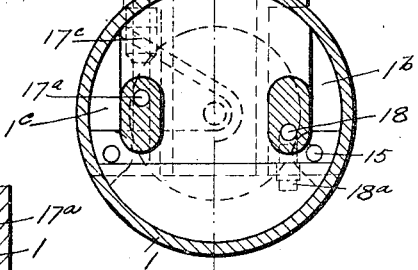

Fig. 3, shows a section taken through the central boss of the piston at A. B. Fig. 2, and Fig. 4 a similar section taken through the upper chamber of the piston at C. D. Fig. 2.

Figure 5:
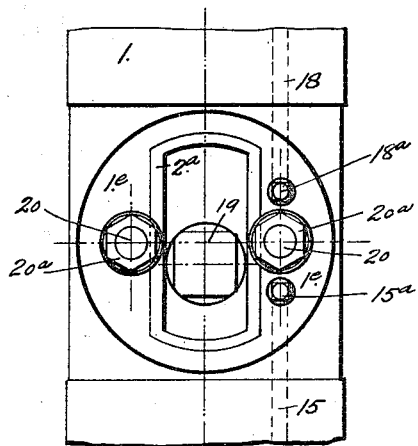
Figure 6:
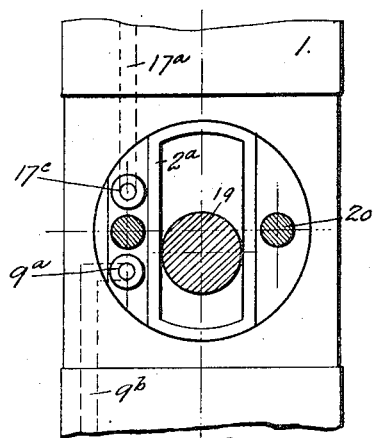

Figs. 5 and 6, show the front and rear views of the counterbores on the vertical faces of the piston of the driving wheel and the air connections between the axle and said piston.

Figure 7:
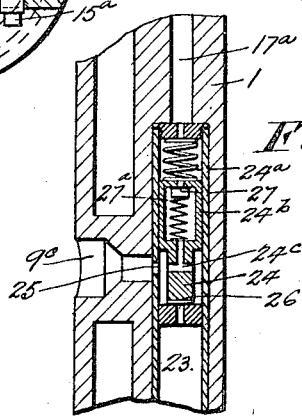

Fig. 7, shows a piston check valve disposed in the vertical air conduit in the piston to control the direction of the passage of the air to and from the device when a single conduit is used for the supply and discharge of air through the control valves from the source of supply.

Figs. 8, 9 and 10 show a front view of a piston attached to the front steering stub-axle and a vertical cross section, and a sectional plan through the center of the axle, respectively, showing the means of making the air connection to the piston and device.

Figs. 11 and 12 show an enlarged cross section of the lower piston packing, annular pressure chamber, and means of securing the same to the piston.

Figure 1:
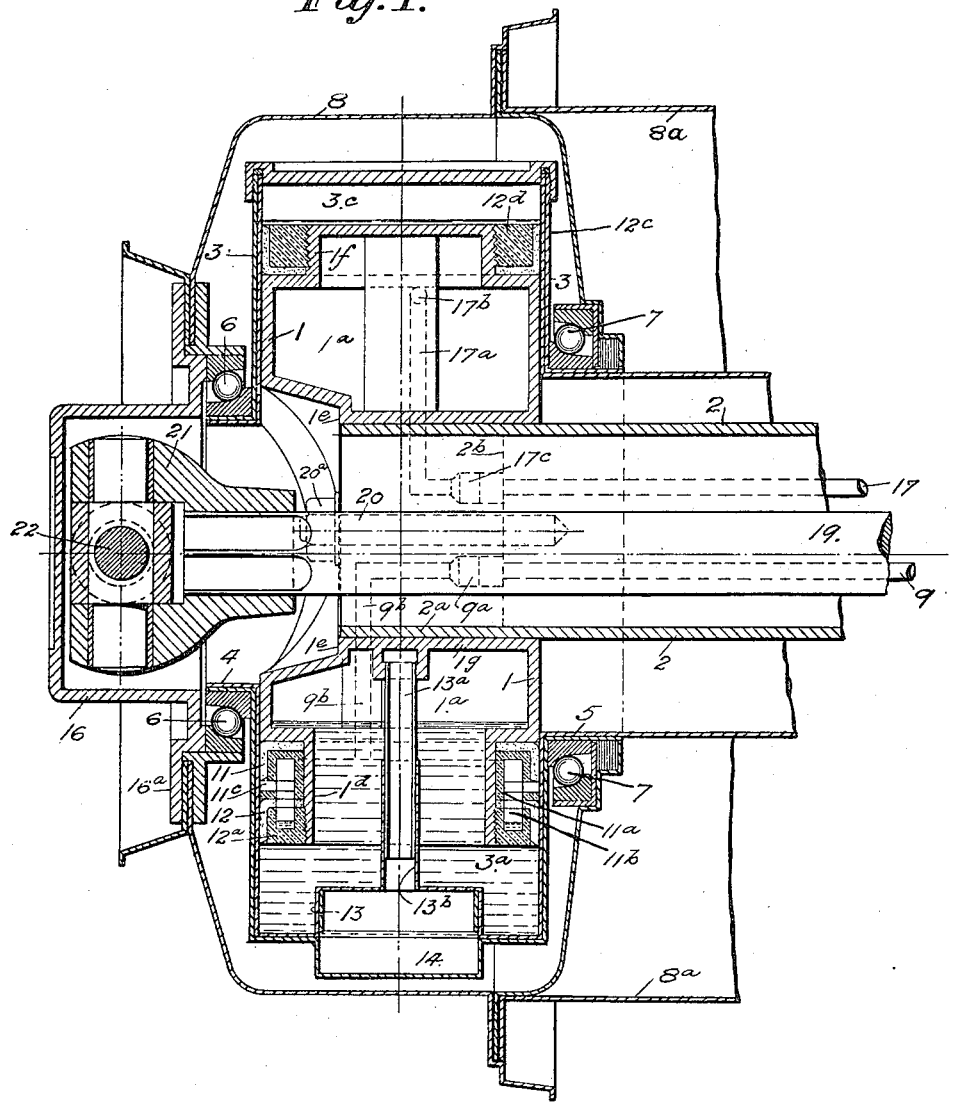
Figure 1, is a vertical cross section of a pneumatic device of the piston and cylinder type disposed in the hub of a rear shaft driven wheel of an automobile, showing the arrangement of the piston packing and the oil collecting chamber formed in the rings securing the packing to the piston.

Referring now to the means of automatically maintaining the piston or plunger in the cylinder of the device air tight and effecting lubrication in the type shown in Figs. 1 and 2, the piston 1 is secured to the axle housing 2 in the vertical plane and the cylinder 3 operates therewith having hollow arms 4 and 5 adapted to envelop the axle end $2^a$ and be guided thereon and permitting a predetermined vertical displacement.

On the outside periphery of arms 4 and 5 the bearings 6 and 7 of the wheel are mounted and revolve.

Air under pressure is supplied to the chamber $1^a$ and reservoir $3^b$ from a compressor or its equivalent or reservoir on the vehicle through suitable piping, flexible tubing and conduit 9.

It is to be understood that air under pressure will be supplied in the manner more fully set forth in my prior U. S. application, Serial No. 866,000, filed Oct. 10, 1914, from the source of supply, passing through the conduit in the axle and thence through the connection that may be had with the conduit 9.

Chambers $3^a$ and $3^c$ are formed in cylinder 3 in the suspension device, one above and one below the axle end $2^a$. Piston 1 which is secured to the axle end $2^a$ in the vertical plane engages in these chambers respectively and coöperates therewith to form two air cushions, the one $3^a$ below the axle containing oil and above which is air in communication with chamber $1^a$ and the reservoir $3^b$, forming the air cushion or air-spring which yieldingly supports the weight upon the wheel and the one above operating as a dash-pot or check-spring to check the vertical play of the cylinder and wheel supported thereon. The dash-pot $3^c$ communicates with the atmosphere and oil reservoir $10^a$ under the control of the piston 1 through vent holes or ports 10 in the wall of the cylinder 3.

The lower end of the piston 1 is provided with suitable cup leather packing rings 11 and 12 one above the other and held in position around the central projecting tube or conduit $1^d$ by means of two metallic rings $11^a$ and $12^a$ having grooves or concentric passages formed in the same and so arranged that when the lower ring $12^a$ is screwed on to the outer periphery of the tube or conduit $1^d$, it secures the said cup leather rings air tight on the piston face and forms a single annular chamber $11^b$.

There is provided in the periphery of the metallic ring $11^a$ a groove $11^c$ which permits any oil escaping past the cup leather 12 to pass into and accumulate in the lower part of the annular chamber $11^b$. The upper cup leather packing ring 11 is used to maintain the annular chamber $11^b$ substantially air tight and in certain cases further additional packing may be provided in the form of piston or felt rings to insure the pistons being practically air tight in the cylinder 3.

Air under pressure is supplied to the chamber $1^a$ and reservoir $3^b$ from a suitable source on the vehicle through conduit 9 which passes through the housing 2, this conduit being in communication with the vertical conduit $9^b$ in the piston 1 and made air tight by means of a packing gland $9^a$ disposed between the inner counterbored face and the vertical face or shoulder $2^b$ of the housing. The said vertical conduit $9^b$ communicates at its lower end with the annular chamber $11^b$ and permits air to pass to said chamber and thence through the check valve $12^b$ disposed in the lower face of the metallic ring $12^a$. The air entering passes through the oil in the lower chamber $3^a$ to the upper chamber $1^a$ of the piston and reservoir $3^b$.

Both ends of the piston 1 are hollow and form air chambers $1^a$ which communicate with each other and the lower oil chamber $3^a$ through opening $1^b$ in a manner to form an enlargement of the lower chamber $3^a$; a further augmentation to this chamber is formed by reservoir $3^b$ disposed on each side of the cylinder 3 and communicating with $1^a$ through the passage $1^c$ in the piston and centrally disposed telescoping tubes $13^a$ and $13^b$ and the central ferrule 13 and passage 14.

To supply oil to the lower chamber $3^a$ and to the requisite depth to insure the complete immersion of the packing 12 at all times a conduit 15, Fig. 5, is provided in the piston extending from the front counterbored face $1^e$ to the lower part of the chamber $1^a$ of the piston where it enters at the desired level. A plug $15^a$ is screwed into the opening of the conduit, access to same and for inserting the oil being afforded through the arm 4 after the cap 16 is removed from the wheel 8, Fig. 1.

The piston 1 in the upper dash-pot $3^c$ is made air tight by means of suitable cup leather packing rings $12^c$ secured to the piston by metallic rings $12^d$ screwed to an extending boss $1^f$ of the piston 1.

To permit air to escape from the device when the control outlet valve opens, a conduit $17^a$ is provided in the body of the piston 1 which communicates with the upper chamber $1^a$ at $17^b$ and is connected to the outlet conduit 17 in the axle or housing 2 by means of the stuffing box or gland $17^c$ which makes an air tight joint between the face of the piston 1 and face $2^b$ of the axle. In order to control the supply and pressure of air in the chamber $1^a$ and reservoir $3^b$ of the device so that the pressure shall at all times be sufficient to support and maintain piston 1 in its predetermined position of suspension in the cylinder 3 and in a state of equilibrium, suitable automatic control valves may be disposed on the inlet conduit 9 and outlet conduit 17 going to and from the respective devices of the four wheels in a readily accessible location.

To maintain and replenish the required quantity of oil in the dash-pot $3^c$ without dismounting the wheel from the housing 2, a conduit 18, Fig. 5, is provided, the latter opening in the face of the front counterbore $1^e$ of the piston 1 and terminating in the upper face of the boss $1^f$ of the same.

Access is made to the said opening of the conduit 18 in the counterbore $1^e$ through the arm 4 of the cylinder 3 by removing the wheel cap 16.

An excess of oil is forced into the said dash-pot by an "oil gun" screwed into the conduit opening and the excess permitted to run back into the gun, leaving the desired quantity in the dash-pot $3^c$.

Fig. 5, shows the front elevation of the counterbore in the piston 1 and Fig. 6, shows a section through the housing end and elevation of the inner counterbore of the same; the piston shown is that of the rear shaft driven wheel in Figs. 1 and 2, the piston 1 having a bore $1^g$ through the center adapted to be mounted on the housing, the housing having a vertical slot with inner faces $2^b$ through which the driving shaft 19 rotates and oscillates in the vertical plane. The section of the opening through the boss $1^g$ permits the axle housing fitting snugly in the same and securing the piston in the vertical plane. To secure the latter endwise to the axle, the portion $2^a$ engaged by the piston terminates in the inner side with the vertical shoulders $2^b$ which engage with the inner vertical face of the counterbore of piston 1; two bolts 20 secured into the faces $2^b$ extend horizontally through the holes in the boss of the piston 1, to the face of $1^e$ of the latter, forming a counterbore in the vertical face of the same. This counterbore is deep enough to permit the piston being secured in position and also makes the air conduit joints by means of nuts $20^a$.

To form a guide to keep the cylinder 3 in its correct horizontal position the inner arm 5 of the cylinder 3 is large enough in diameter to provide for the hollow housing $2^a$ and the displacement provided for the oscillation of the wheel on the axle. In the arm 5 vertical guides $5^a$ integral with the cylinder 3 are disposed and adapted to engage with the vertical rubbing surfaces $2^e$ formed on the housing 2 which extends to the front of the brake drum $8^a$.

The outer arm 4 affords facility when the cap 16 is removed of securing the nuts $20^a$ in position on the bolts 20, when securing the wheel to the axle and allows room for the universal joint 21 operating freely. The shaft 19 is attached to the central drive shaft from the motor through the usual differential gears, by universal joints, which are attached to the stub driving shaft secured in the differentials from endwise movement.

The universal joints are placed close to the differentials. The shaft 19 which is secured as above described is attached to the hub 8 of the wheel by universal joint 21 secured to the cap 16 by pin 22 held in position by nuts, has a squared end which engages with the sleeve of the universal joint 21 and is adapted to slide therein as the shaft oscillates in the vertical plane. The cap 16 is secured by the flange $16^a$ and bolts which may form also an adjustment for the bearings 6 and 7.

Fig. 7, shows the detail of the piston check valve used in the air conduit in the piston 1 when only a single conduit is used to convey the air to and from the air valves and the source of supply. The opening $9^c$ affords means of supplying air to and releasing it from the device. This opening communicates with the lower end of piston 1 through the tube 23, which contains the check valve piston 24. This tube is inserted into the piston 1 from the lower face and is made tight at both ends by the cup leather packing and rings securing the same to the piston. It is so disposed as to permit the opening 25 in the side of the same registering with the opening $9^c$.

Below the latter opening a valve 26 is formed in the tube 23 being normally closed by the piston valve 24 which is held down on the same by the spring $24^a$ at the upper end of the tube 23. The upper part of the valve 24 is in the form of a piston $24^b$ adapted to operate and fit substantially air tight in the tube 23. In the piston a check valve 27 held to its face by a spring $27^a$ permits air to pass from the upper chamber $1^a$ of the piston 1 through the tube $17^a$ and the passage $24^c$ to the conduit $9^c$.

In action, when the air inlet control valve is open and air flows under pressure to the device it passes through conduit $9^c$, and the pressure being greater than that in the device, it acts on the under side of the piston valve 24 raising the same and allows the air to flow to the annular chamber $11^c$ in the lower part of the piston 1 through the check valve $12^b$ to the device.

When the air outlet control valve is open, the air in the upper chamber $1^a$ of the piston passes through conduit $17^a$ and through the check valve $24^b$ in the piston valve 24 and through the passage $24^c$ in the latter to the conduit $9^c$ when it passes to the control valve and escapes to the atmosphere.

When the control valve closes the check valve 24 is forced to its seat 26 and closes the lower valve so preventing any leakage of air from the upper chamber $1^a$ of the piston leaking through the packing of the annular chamber $11^c$ to the atmosphere.

In operation, when a vehicle fitted with suspension devices of the type shown in Figs. 1 and 2, is in its normal condition of suspension the air in the chamber $1^a$ and reservoir $3^b$ is at a pressure sufficient to support the piston 1 and its load in the predetermined position of suspension. In this position the oil in the lower cylinder $3^a$ submerges the sliding joint between the lower periphery of the piston 1 and the cylinder 3 the level being maintained well up the tube $1^d$ so that at any displacement possible the piston 1 in the cylinder will be oil sealed.

Although the piston 1 is furnished at its lower periphery with suitable cup leather packing rings 12 to reduce the leakage of oil to a minimum, yet a certain amount will escape past the packing under the pressure of the air and movement of the parts. Such oil escaping past the cup leather 12 collects in the groove $11^c$ and passes by means of suitable passages to the annular chamber $11^b$ in the lower part of the piston where it is trapped and accumulates.

This accumulation may go until for any reason, such as increase of load on the vehicle or loss of air from the device, more air is required to be supplied to the device.

Air is then supplied from the source on the vehicle or any other source, through a suitable control valve through conduit 9 in the axle and passage $9^b$ in the piston to the chamber $11^b$.

Since this chamber is made substantially air tight from the atmosphere by means of packing 11 which may also be augmented by further packing rings, the pressure rises in the said chamber until it is greater than that in the device, the check valve $12^b$ is then forced from its seat and the accumulated oil that has escaped past the packing ring 12 and been trapped in the chamber $11^b$ is driven back into the chamber $3^a$ of the device, the ingoing air rising through the oil and replenishing the air in the chamber $1^a$ and reservoir $3^b$ until the piston again assumes its normal position when the control valve shuts off the supply. The valve $12^b$ closes and the oil thus conserved enables the oil-seal of the piston packing ring 12 to be constantly maintained.

Any air remaining in the chamber $11^b$ may slowly leak past the packing ring 11 but since the volume is comparatively small the loss is negligible and does not affect in any way the pressure of air in the device and therefore the condition of normal suspension.

When the load on the vehicle is reduced and it is necessary to reduce the pressure of air in the respective devices in order that they may be in equilibrium with the load supported thereon, the control valve opens on the discharge pipe 17 permitting air to escape from the upper chamber $1^a$ of the piston and reservoir $3^b$ through passage $17^b$ and pipe 17 until the pressure in the device balances the load at the desired position when the control valve closes.

Free ingress and egress of air between the upper chamber $1^a$ and reservoir $3^b$ is maintained through the telescoping tubes $13^a$ and $13^b$ which are immersed in oil on the outside, the sliding joint between the same being made oil tight in any suitable manner.

The annular space formed between the outer wall of the ferrule 13 and at the bottom of cylinder 3 which is normally filled with oil, acts as an oil dash-pot to cushion the piston 1 and its parts at the lower portion of its displacement by ejecting the oil from the said space as it descends through an annular space or clearance provided between the ferrule 13 and the face of the tube $1^d$.

Figs. 8, 9, and 10, show the means of supplying and discharging air to and from the device as applied to the front wheel of a vehicle.

The stub axle $2^c$ is adapted at one end to engage with the boss $1^h$ of the piston 1, the inner end of said axle being enlarged to form a shoulder $2^d$ adapted to engage with inner countersunk face of the piston. The inner end of the axle $2^f$ and the collar guide $2^h$ secured to the outer end of the axle by the nut $2^i$, are adapted to engage with guides in the arms of the cylinder of the device to guide the wheel in the vertical plane.

Air under pressure is supplied from the source through passage $9^c$ and connecting ducts in the piston 1 to the annular chamber $11^b$ and to the device as described above. A joint or flexible gland $9^e$ is provided between the inner countersunk of the piston and the vertical shoulder $2^d$ of the axle and made air-tight by the nut $2^i$ which also secures the wheel to the axle.

A similar conduit $17^d$ disposed on the opposite side of the axle $2^f$ provides similar means for discharging air from the device from the upper chamber $1^a$ of the piston through passage $17^e$ to the control valve on the vehicle, a joint or flexible gland $17^f$ being provided to make an air-tight joint between the piston 1 and the axle $2^f$.

The air is conducted to and from the vehicle to the axle by means of flexible hose connected to openings $9^c$ and $17^d$ which permits the axle $2^c$ being turned on the vertical bolt $2^j$ to steer the vehicle.

Oil is supplied to the lower chamber $3^a$ of the device through suitable passages $15^b$ and to the upper dash-pot $3^c$ through passages $18^c$ from the front counterbore $1^h$ accessible through the outer arm of the cylinder 3 when the cap is removed from the hub.

Both passages are normally closed by screw plugs $15^c$ and $18^b$ respectively, countersunk opening in the guide face $2^h$ permitting the latter to cover the same and press securely up to the face of the piston by the nut $2^i$ when the wheel is secured to the axle.

Fig. 12 shows the arrangement of the packing and chamber $11^b$ at the lower face of the piston 1 when no valve is provided to communicate between the said chamber $11^b$ and the device. In this arrangement the cup leather packing ring 12 is adapted to permit any oil that may be forced past the same from the chamber $3^a$ to the annular chamber $11^b$ being collected therein and forced back into the device by the pressure of the air supplied to the device through the chamber $11^b$ as described above, said air and oil being forced past and between the periphery of the cup leather 12 and the cylinder wall to the chamber $3^a$, the cup leather packing ring 12 in this case acting as a non return or check valve.

What I claim is:

1. In a pneumatic anti-vibration device for automobiles, hollow members in reciprocable telescoping engagement having a sliding joint and a chamber trapping liquid lubricant which escapes from the sliding joint, and also forming a chamber in communication through the outlet from the trapping chamber with a source of supply of gaseous fluid under pressure always greater than that of the chamber.

2. In a pneumatic, anti-vibration device for automobiles, hollow members in reciprocable telescoping engagement, a source of supply of gaseous fluid under pressure, the hollow members forming a sliding joint and also a chamber for trapping liquid lubricant which escapes from the sliding joint, and also providing a chamber that is in communication through the outlet of the trapping chamber with the source of supply, and means sealing the trapping chamber outlet against back flow.

3. In a pneumatic anti-vibration device for automobiles including hollow members in reciprocatable telescopic engagement having a sliding joint and forming a chamber, means for maintaining the liquid lubricant of the sliding joint resulting from such engagement comprising packing rings disposed between said reciprocable parts, there being an annular chamber between the packing rings, means for supplying gaseous fluid under pressure to the chamber of the device which is likewise in communication with the annular chamber and means between the annular chamber and the main chamber to prevent backward movement of the fluid.

4. In a pneumatic anti-vibration device for automobiles, hollow members in reciprocable telescoping engagement having a sliding joint and a chamber for trapping liquid lubricant which escapes from the sliding joint, and also forming a chamber in communication through the outlet into the trapping chamber with a source of supply of gaseous fluid under pressure always greater than that of the chamber, there being a vent conduit in the members from a point above the level of the lubricant in the first named chamber to atmosphere, and means for controlling the flow through the said vent conduit.

5. In a pneumatic anti-vibration device for automobiles, including a wheel hub, a piston and cylinder reciprocatable thereon, secured respectively to the hub and companion axle, means for maintaining the liquid lubricant seal of the said sliding joint in the chamber of the device, comprising telescoping tubes disposed between the piston and cylinder or reservoir adapted to permit free passage of gaseous fluid to and from the respective chambers through the lower part of the chamber in which the liquid lubricant sealing the sliding joint is disposed to prevent the said liquid entering and obstructing said passage.

6. In a pneumatic anti-vibration device for automobiles, a wheel hub, an axle therefor, a piston and cylinder reciprocable therein secured to the hub and axle respectively, and arranged to form a chamber, the cylinder having an opening in register with the hub bore and a piston having an oil conduit with inlet at the cylinder opening and outlet into the chamber, a detachable hub cap giving access to the cylinder opening and said inlet and means for sealing the inlet.

7. In a pneumatic anti-vibration device for automobiles, a wheel hub, an axle therefor, a piston and cylinder reciprocable thereon secured to the hub and axle respectively, and arranged to form a dashpot at the upper end, the cylinder having an opening in register with the hub bore, and a piston having an oil conduit leading from the said cylinder opening to the interior of the dashpot, a detachable hub cap giving access to the cylinder opening and said inlet, and means for sealing the inlet.

8. In a pneumatic anti-vibration device for automobiles, a wheel hub, an axle therefor, a piston and cylinder in reciprocable engagement secured to the hub and axle respectively, and arranged to form a chamber near one end and a dashpot at the other, the cylinder having an opening in register with the hub bore and a piston having oil conduits connecting the said opening with the chamber and dashpot respectively, and a detachable wheel hub cap giving access to the opening and said conduit inlets.

9. In a pneumatic anti-vibration device for automobiles, a wheel hub, an axle having a reduced end portion, a cylinder secured to the wheel hub, a piston reciprocable in the cylinder having a counterbored opening that receives the reduced end portion of the axle, the piston and axle having conduits in register at the meeting faces formed by the counterbore of the piston and axle shoulder and packing means sealing the joint at the junction of the conduits.

10. In a pneumatic anti-vibration device for automobiles, a wheel hub, an axle having a reduced end portion, a cylinder secured to the wheel hub, a piston reciprocable in the cylinder having a counterbored opening that receives the reduced end portion of the axle, the piston and axle having conduits in register at the meeting faces formed by the counterbore of the piston and axle shoulder, and means sealing the joints at the junction of the conduits, the wheel securing the packing against displacement.

11. In a pneumatic anti-vibrating device for automobiles, hollow members in reciprocable telescoping engagement forming a sliding joint, the end portion of one of said members forming an annular chamber adapted to trap lubricant that may escape from the sliding joint and being arranged to displace lubricant that lies in the companion end portion of the other hollow member when the said annular chambered member approaches the limit of motion toward the other member, the companion end portion of the other member also forming a chamber that communicates through the outlet of the lubricant trapping chamber with a source of supply of gaseous fluid that is under a pressure which is always greater than that of the chamber.

In testimony whereof I affix my signature in presence of two witnesses.

GEORGE WILLIAM BELL.

Witnesses:
ANNA M. DORR,
G. E. McGRANN.

Copies of this patent may be obtained for five cents each, by addressing the "Commissioner of Patents, Washington, D. C."